United States Patent [19]

Nimerick

[11] Patent Number: 4,669,544
[45] Date of Patent: Jun. 2, 1987

[54] REDUCING PARAFFIN DEPOSITS ON PARAFFIN CONTAMINATED SURFACES

[75] Inventor: Kenneth H. Nimerick, Tulsa, Okla.

[73] Assignee: Dowell Schlumberger Incorporated, Tulsa, Okla.

[21] Appl. No.: 853,298

[22] Filed: Apr. 17, 1986

[51] Int. Cl.$^4$ .................... B08B 3/08; E21B 37/06; E21B 43/25
[52] U.S. Cl. .................... 166/300; 166/304; 134/22.19; 134/40; 252/8.553
[58] Field of Search ............. 166/300, 304, 312; 252/8.55 B, 8.553; 134/22.11, 22.16, 22.19, 31, 32, 40

[56] References Cited

U.S. PATENT DOCUMENTS

| | | | |
|---|---|---|---|
| 2,602,778 | 7/1952 | Snyder | 166/304 X |
| 2,817,635 | 12/1957 | Goldman et al. | 252/8.55 B |
| 3,241,614 | 3/1966 | Bertness | 166/304 |
| 3,279,541 | 10/1966 | Knox et al. | 166/300 |
| 3,578,589 | 5/1971 | Hwa et al. | 134/22.19 X |
| 3,909,422 | 9/1975 | Sample, Jr. | 252/8.55 B |
| 3,979,315 | 9/1976 | Tate et al. | 252/8.66 B X |
| 4,120,356 | 10/1978 | Meister | 252/8.55 B X |
| 4,207,193 | 6/1980 | Ford et al. | 252/8.55 B |
| 4,455,175 | 6/1984 | Settineri et al. | 166/304 X |
| 4,536,222 | 8/1985 | Settineri et al. | 166/304 X |

Primary Examiner—George A. Suchfield
Attorney, Agent, or Firm—L. Wayne White

[57] ABSTRACT

A method of reducing paraffin deposits on a paraffin contaminated surface. The surface is contacted with a sulphur trioxide containing liquid to react with the paraffin, and convert at least a portion of it to a water-dispersible material. The surface is also contacted with a surfactant containing or providing liquid, so as to reduce the amount of organic precipitate formed by the action of the sulphur trioxide on the paraffin. Additionally the surface is usefully rinsed with an aqueous liquid, preferably an aqueous alkaline liquid, following it being contacted with the sulphur trioxide. The surface may be contacted with the surfactant containing liquid, either prior to, or subsequent to, contacting it with the sulphur trioxide containing fluid.

27 Claims, 1 Drawing Figure

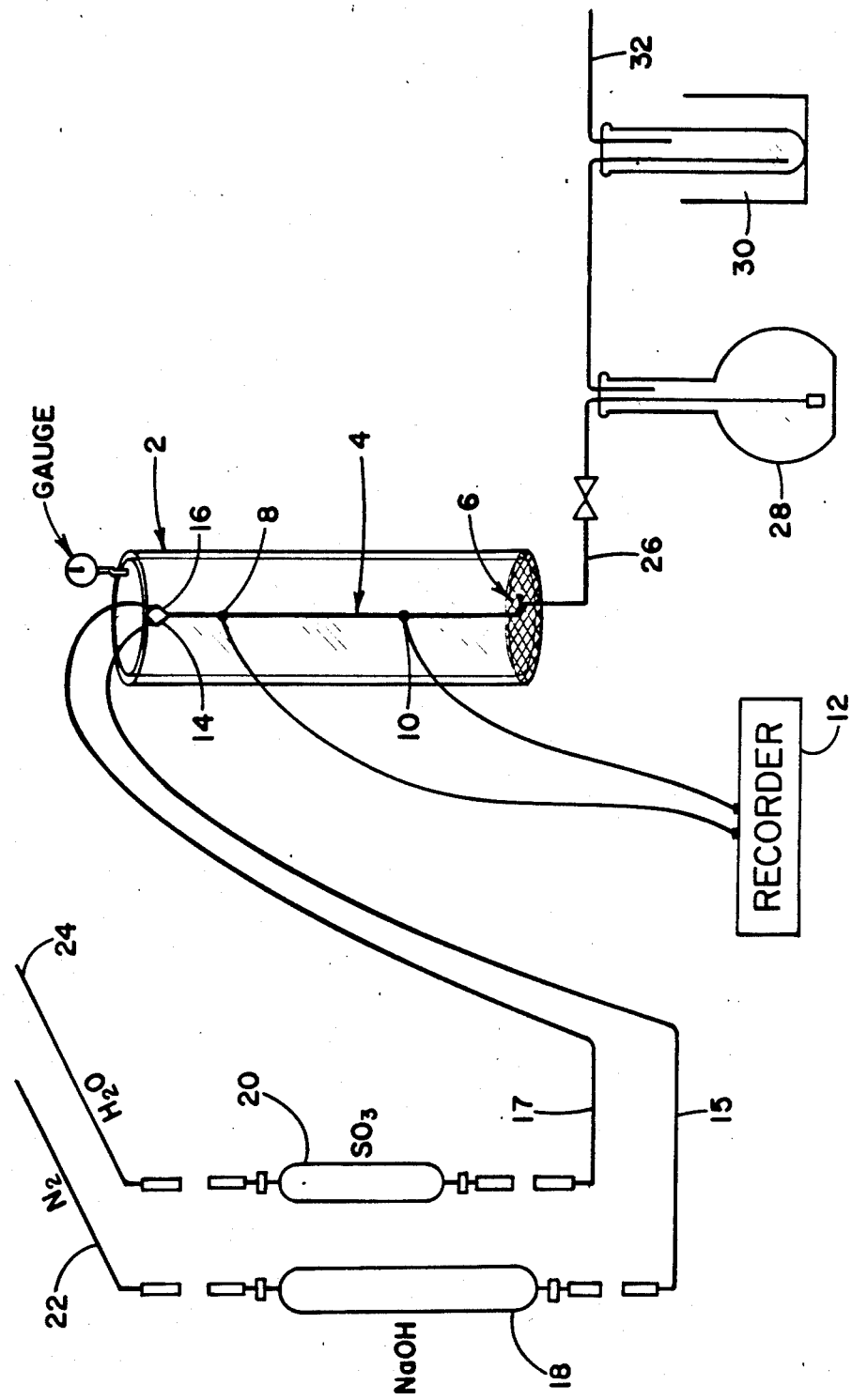

REDUCING PARAFFIN DEPOSITS ON PARAFFIN CONTAMINATED SURFACES

FIELD OF THE INVENTION

This invention relates to a method of reducing paraffin deposits on paraffin contaminated surfaces by using sulfur trioxide, which method results in reduced production of water insoluble solid precipitates (in particular, char).

TECHNOLOGY REVIEW

A long standing problem in the production, handling, storage and transportation of natural gas or crude oil, particularly the latter, is deposition of solid or semi-solid (e.g., waxy) hydrocarbons on the surfaces of equipment used for these purposes. These hydrocarbons are dissolved in the natural gas or crude oil at the comparatively high temperatures of underground formations, but are insoluble to varying degrees at the temperatures at which most production, handling, storage and transfer equipment are maintained. The accumulation of these hydrocarbons, such as waxes, asphaltenes and resins (herein collectively referred to as "paraffins"), can result in partial or complete plugging of pipes, etc. For example, as crude oil is pumped from a production well through production tubing, paraffins deposit on the inner surface of such tubing as the crude oil cools. Similarly, in the transport of crude oils containing soluble paraffins, flow in pipelines can be restricted by the deposition of these paraffins as the crude oil cools during transport.

Methods have been proposed in the past, for both removing or reducing such paraffin deposits, or inhibiting their formation. Such methods include mechanically removing the paraffin by various means, as well as a variety of chemical treatments. An example of a chemical treatment, to remove paraffin deposits, is disclosed in U.S. Pat. No. 1,382,337. That patent discloses flowing a solvent, which is primarily aqueous sodium hydroxide, down a well to remove paraffin. U.S. Pat. No. 1,608,869, discloses an alternate chemical treatment for removing paraffin from adjacent a well, and an apparatus for accomplishing the same. That method requires first exposing the sand adjacent the well to an acid such as sulfuric acid, followed by alkali. A similar process is disclosed in U.S. Pat. No. 139,010. U.S. Pat. No. 3,342,262, on the other hand, contacts the solid hydrocarbons in oil wells or producing formations, or flow lines, with polyol esters of fatty acids. This is followed by an alkali metal hydroxide to saponify the esters, and thereby apparently assist in dissolving the solid hydrocarbons.

Attempts to chemically treat various surfaces in order to inhibit paraffin deposition thereon, include the method of U.S. Pat. No. 2,818,079. The method of that patent, attempts to inhibit wax deposition on surfaces in a pipe, by coating it with a hydrous gel coating. Other methods have included providing an additive to the fluid, such as crude oil, from which waxy material may tend to separate. For example, U.S. Pat. No. 3,693,720 discloses a method wherein certain specified polymers are added to oil flowing in a well to inhibit wax deposition. U.S. Pat. No. 2,817,635 discloses a method intended to inhibit wax deposition from transported fluids, such as crude oil, by injecting into the fluid an alkali metal silicate and an organic non-ionic, surface-active agent. Likewise U.S. Pat. No. 3,244,188 suggests first flushing the surface subjected to paraffin deposits with an alkaline agent, and then contacting the surface with certain vinyl or ethylene polymers. This latter patent also apparently suggests adding an aqueous polymer solution of the foregoing type to oil flowing within the pipe. Along a similar line, CA No. 960,726 suggests coating a crude oil conveying pipeline, with a protective silicate film to inhibit wax deposition, such as an alkali metal and/or alkaline earth metal silicate.

Other chemical treatments which have attempted to remove waxes or paraffins, include that described in U.S. Pat. No. 3,162,601. In the method of that patent, an ethoxylated polypropylene glycol is used to break what was allegedly a water-in-paraffin emulsion coating in a pipe, for example in well tubing, and form a paraffin-in-water emulsion. Other art which relates generally to facilitating hydrocarbon flow within a pipeline or the like, includes U.S. Pat. No. 4,099,537. There, transportation of viscous hydrocarbons through a pipeline is facilitated by introducing a surfactant into the flowing hydrocarbons. U.S. Pat. No. 3,259,187 provides a method which is stated to facilitate displacement of viscous oil from an underground formation. This latter method utilizes sulfur trioxide to react with some of the hydrocarbon materials to produce petroleum sulfonates, and in particular aromatic sulfonic acids from the aromatic hydrocarbons in the formation, so as to assist in emulsifying the oil within the formation during a secondary oil recovery technique, known as water flooding. A similar method is disclosed in U.S. Pat. No. 3,302,711 except the organic sulfonate surfactants, are produced by first injecting sulfonatable organic compounds into the reservoir, followed by an aqueous alkali metal sulfite solution. The nature of the surfactants produced by reaction of oleum or sulfur trioxide on aromatics in oil distillates or extracts, which surfactants might be used in tertiary oil recovery, is discussed in the Society of Petroleum Engineers of AIME Paper No. SPE 6119, entitled "Sulfonation of Petroleum Feed Stocks in a Wiped Film Reactor", presented at the 51st Annual Fall Technical Conference and Exhibition of the Society of Petroleum Engineers of AIME, held in New Orleans, U.S.A., Oct. 3-6, 1976.

Probably the most significant advance made in removing paraffin under the conditions described, are the methods disclosed in U.S. Pat. Nos. 4,455,175 and 4,536,222, both to Settineri et al. The methods of the foregoing patents, involve exposing the surfaces of equipment in contact with crude oil or natural gas, to sulfur trioxide. By such means, paraffin deposition is effectively inhibited. In addition, the majority of paraffin already deposited on the equipment surfaces, is converted to water dispersible material, which can be removed from the surface by rinsing it with an aqueous liquid, preferably an alkaline aqueous liquid. The foregoing method can produce a certain amount of precipitate, which is primarily organic and char-like in appearance (which car-like material is referred to as "char" in this application). Such char is insoluble in water or common organic solvents, such as hexane. It would be desirable that the paraffin reducing method of the foregoing Settineri et al. patents, could be practiced with reduced formation of the precipitate.

SUMMARY OF THE INVENTION

The present invention provides a means for reducing the formation of precipitate during operation of the methods in U.S. Pat. No. 4,455,175 and 4,536,222 to Settineri et al. Broadly, the method of the present invention then, is an improved method of reducing paraffin deposits on a paraffin contaminated surface using $SO_3$. The method comprises first contacting the surface with a sulfur trioxide containing fluid, to react with the paraffin and convert at least a portion of it to a water dispersible material. The meaning of a "sulfur trioxide containing fluid" and like terms, is the same as that as assigned in the foregoing patents to Settineri et al., and those patents are incorporated herein by reference. In addition, the method also comprises contacting the surface with a surfactant containing fluid, so as to reduce the amount of precipitate formed by the action of sulfur trioxide on the paraffin. This latter step can be conducted either before or after the step involving sulfur trioxide.

Alternatively, the surface can be contacted with a surfactant providing fluid, rather than a surfactant containing fluid, which surfactant providing fluid will provide a surfactant in the presence of sulfur trioxide. Such fluids might include aromatic hydrocarbons. In such case, the surface would be contacted with the surfactant providing fluid, prior to contacting it with a sulfur trioxide containing fluid. The surfactant containing or providing fluid, is provided so as to reduce the amount of precipitate formed by the action sulfur trioxide on the paraffin.

The method further additionally comprises rinsing the surface with an aqueous liquid, preferably an alkaline aqueous liquid, following the step of contacting it with sulfur trioxide, and no earlier than the step of contacting it with a surfactant containing or surfactant providing fluid. It is further preferred that the surfactant containing fluid, is a viscous fluid so a substantial portion of it adheres to the paraffin deposits. Preferably, such as viscosified aqueous containing fluid, so that an amount of the fluid adheres to the paraffin which is substantially greater than would adhere when the fluid is not viscosified. The surfactant containing fluid can contain between about 0.01% to about 20% by wt. of the surfactant and preferably between about 0.1% to about 20%.

The method described above, has particular application to increasing production from a crude oil or gas producing well, the production of which has been reduced by paraffin deposits. That is, allowing increased production to a level above the reduced level at which the well was producing as a result of paraffin deposits. In such case, production of the well is first suspended. The sulfur trioxide containing fluid, and the surfactant containing fluid, are then passed down the tubing of the well, to contact the paraffin deposits thereon. The tubing is then rinsed with the aqueous liquid, and the well then brought back into production.

DRAWING

Embodiments of the invention will now be described, with reference to the single FIGURE, which is a schematic view of an experimental apparatus used to execute a method of the present invention.

DETAILED DESCRIPTION OF EMBODIMENTS OF THE INVENTION

In order to study the reaction of sulfur trioxide on paraffin deposits, and evaluate the method of the present invention, a laboratory simulator was constructed in accordance with the schematic diagram of the FIGURE. The simulator was constructed from stainless steel, glass, and TEFLON (a trademark for a tetrafluoroethylene fluorocarbon polymer). A main glass chamber 2, has a ⅝" tubing rod 4 disposed therein. A 100 mesh stainless steel screen 6 is positioned at the bottom of chamber 2 to catch any precipitate formed between the reaction of sulfur trioxide with paraffin. Two thermocouples 8, 10 are disposed 6" and 18" respectively, from the top of rod 4. A recorder 12 records the temperatures sensed by thermocouples 8, 10. Two nozzles, 14, 16 are disposed adjacent an upper end of rod 4, and are directed to deliver liquid onto rod 4 at an angle of 20°. Nozzle 14 is a ⅛ VV 1502 SS VEE nozzle that delivers 530 cc/min. at 20 psi, while nozzle 16 is ⅛ VV 1502 SS VJET nozzle that delivers 265 cc/min. at 20 psi.

A shot tank 18 is provided to deliver the caustic solution to line 15 and hence nozzle 14, while a shot tank 20 is provided to deliver the sulfur trioxide to nozzle 16 through line 17. Shot tank 20 is maintained at a temperature of close to 100° F. (approximately 37.8° C.) by heating means (not shown) so that the sulfur trioxide would remain liquid. Nitrogen line 22 provides nitrogen at a pressure of 20 psi, to deliver either the caustic solution or sulfur trioxide to their respective nozzles 14, 16. Pre-flushes and post-flushes can be delivered from further shot tanks (not shown) through line 15, to nozzle 14, under the influence of nitrogen pressure from line 22. Any effluent from chamber 2, which passes through screen 6, passes out line 26 and into scrubber 28 which contains a sodium hydroxide solution. Scrubber 28 is vented through cold trap 30 which in the experiments below, is chilled to about 8° F. by ice and calcium chloride, to condense any sulfur trioxide/sulfuric acid vapors.

In the experiments and trials below, one of either a West Pennsylvania or West Texas paraffin was used. The analysis of the foregoing paraffins are given in Table I below.

TABLE I

| ANALYSIS OF PARAFFIN DEPOSITS | | |
|---|---|---|
| | Source and Amount | |
| Components | W. Pennsylvania | W. Texas |
| Paraffin | 57.0% | 43.0% |
| Asphaltenes | 1.0% | 26.0% |
| Water | 4.0% | 1.0% |
| Inorganics | <1.0% | — |
| Volatiles | 37.0% | 25.0% |
| Sludge | — | <5.0% |

The following procedure was followed in all of the following trials, except as noted:

1. The selected paraffin deposit is added to rod 2 using a spatula. The apparatus of the FIGURE is assembled and chamber 2 is pressure tested.

2. The preflush treatment additives, if any, are added to a preflush shot tank (not shown in the FIGURE) and positioned for connection to line 15 and nozzle 14.

3. The liquid $SO_3$ at 100° F. (37.8° C.) (density approximately 1.85 g/cc), is loaded into shot tank 20 using a 20 cc glass syringe equipped with a 6" long stainless steel needle. The top connection is screwed on and the tank connected to nozzle 16 through line 17.

4. The preflush shot tank (if any), and the caustic postflush are connected to nozzle 20.

5. The preflush is added first, followed by the $SO_3$, and then the aqueous caustic solution.

6. The amount of rod residue is determined by removing it from the rod and weighing.

7. The precipitate is collected, dried and weighed.

A number of trials were performed, in order to first ascertain the effects of varying the amount of sulfur trioxide used and its contact time with the paraffin. In these trials, approximately 27 grams of the West Pennsylvania paraffin were placed on rod 4. The results of these trials, are summarized in Table II.

TABLE II

THE EFFECTS OF $SO_3$ CONCENTRATIONS AND CONTACT TIMES ON WESTERN PENNSYLVANIA PARAFFIN

| Trial | Maximum Thermocouple Temp (°F.) 1 | 2 | Paraffin Deposit (gms) | Vol $SO_3$ (cc) | Contact Time (sec) | Vol/NaOH (cc) | Precipitate (gms) | Rod Paraffin Residue (gms) |
|---|---|---|---|---|---|---|---|---|
| 1 | 160 | 121 | 25.0 | 30 | 3.5 | 250-7.5% | 13.0 | 2.0 |
| 2 | 150 | 126 | 25.0 | 40 | 4.8 | 250-7.5% | 12.5 | 1.3 |
| 3 | 168 | — | 26.4 | 40 | 2.4 | 350-10.0% | 10.5 | 1.6 |
| 4 | 156 | 130 | 26.0 | 40 | 9.0 | 350-10.0% | 7.4 | 0.5 |
| 5 | 185 | 158 | 27.0 | 50 | 12.0 | 350-12.0% | 6.0 | <0.1 |

The results tabulated in Table II, suggest that the weight ratio of liquid sulfur trioxide to paraffin, should be at least about 3.5/1.0 for effective cleaning of the rod 4 (bearing in mind that the density of liquid sulfur trioxide was about 1.85 g/cc). When the sulfur trioxide volume was maintained at 40 cc, and the contact time increased, less precipitate and cleaner rods resulted. However, a weight ratio of sulfur trioxide and paraffin of at least 3.5/1.0 is preferred, in order to avoid unduly long contact times with the paraffin. In Trial 5, which resulted in the cleanest rod 5, 5.6 grams precipitate was produced (22.2% by wt. based upon the original weight of paraffin present on rod 4), along with approximately 0.42 grams of inorganic precipitate (7% by wt. of the original weight of paraffin). The foregoing organic precipitate was analyzed as being 0.84 grams (15% by wt.) paraffin, and 4.8 grams (85% by wt.) char.

In order to evaluate the effects of surfactant containing preflush and postflush treatments, on reducing the formation of the foregoing organic precipitate (in particular, the char), during reaction of sulfur trioxide with paraffin, a series of further trials were performed. These trials used 40 cc of sulfur trioxide, which was slightly below optimum volume indicated by the results of Table II, in order to better study the effects of the surfactant. The surfactants used, are items A-I, and are identified below as items A to J and the results of these further trials are tabulated in Table III below. The surfactants used are:

A—13% nonylphenol/ethylene oxide surfactant (nonionic surfactant) and 87% aromatic solvent B—Nonylphenol/ethylene oxide of approximately 9 moles ethylene oxide per mole of nonylphenol type (nonionic surfactant)

C—Nonylphenol/ethylene oxide of approximately 15 moles of ethylene oxide per mole of nonylphenol type (nonionic surfactant)

D—Ethylene glycol monobutyl ether (nonionic surfactant)

E—Sodium dodecyl diphenyl ether disulfonate (anionic surfactant)

F—Di-sec-butylphenol with 10 moles ethylene oxide (nonionic surfactant)

G—Fluorinated alkyl quaternary ammonium iodides (cationic surfactant) and trimethyl heptanol with 7 moles ethylene oxide (nonionic surfactant)

H—3.5% sodium metasilicate, 15% potassium pyrophosphate, 5.6% sodium tripolyphosphate, 20% of J (see below) and 56% water.

I—Tertiary amine/ethylene oxide condensation product of the primary fatty amine with 15 moles of ethylene oxide (slightly cationic surfactant)

J—Sodium n-decyl diphenyloxide disulfonate (anionic surfactant)

TABLE III

THE EFFECT OF PRE AND POST TREATMENTS ON REDUCING CHAR FORMED BY $SO_3$ AND A WESTERN PENNSYLVANIA PARAFFIN

| Trial | Maximum Thermocouple Temp (°F.) 1 | 2 | Pretreatment | Amount $SO_3$ in cc | Neutralization Stage/Additives | Precipitate (gms) | Rod Paraffin Residue (gms) |
|---|---|---|---|---|---|---|---|
| 6 | 156 | 130 | None | 40(9)* | 350 cc of 12% NaOH | 7.4 | 0.5 |
| 7 | 148 | 135 | None | 40(9) | 300 cc of 10% NaOH + 0.5% G | 3.7 | 0.6 |
| 8 | 175 | 150 | None | 40(9) | 300 cc of 10% NaOH + 0.5% J | 3.5 | 0.8 |
| 9 | 174 | — | None | 40(9) | 300 cc of 10% NaOH + 0.5% I | 3.4 | 0.8 |
| 10 | 182 | 124 | 50 cc of $H_2O$ | 40(9) | 300 cc of 10% NaOH | 5.8 | 1.3 |
| 11 | 205 | 130 | 60 cc of 10% A in $H_2O$ | 40(9) | 300 cc of 10% NaOH | 3.0 | 0.7 |
| 12 | 178 | 172 | 50 cc of 1.3% (65% B + 35% C) in $H_2O$ | 40(9) | 300 cc of 10% NaOH | 4.1 | 2.4 |
| 13 | 144 | 135 | 50 cc of 9% A + 1% D in $H_2O$ | 40(9) | 300 cc of 10% NaOH | 3.7 | 0.7 |
| 14 | 182 | 132 | 40 cc of 0.5% E/$H_2O$ | 40(9) | 300 cc of 10% NaOH + 2% H | 2.6 | 2.1 |
| 15 | 165 | 155 | 80 cc of 10% NaOH + 0.5% F | 40(9) | 262 cc of 10% NaOH | 6.3 | 0.6 |
| 16 | 175 | — | 50 cc of 0.5% I | 40(9) | 300 cc of 10% NaOH | 3.0 | 1.2 |

TABLE III-continued
THE EFFECT OF PRE AND POST TREATMENTS ON REDUCING CHAR FORMED BY SO₃ AND A WESTERN PENNSYLVANIA PARAFFIN

| Trial | Maximum Thermocouple Temp (°F.) 1 | 2 | Pretreatment | Amount SO₃ in cc | Neutralization Stage/Additives | Precipitate (gms) | Rod Paraffin Residue (gms) |
| --- | --- | --- | --- | --- | --- | --- | --- |
| 17 | 170 | 125 | in H₂O 50 cc of 10% A in H₂O | 40(9) | 300 cc of 10% NaOH + 0.5% G | 2.7 | 0.3 |

Note:
Approximately 27.0 gms of paraffin was used in these tests
*Contact time in seconds It will be seen from the results of Trials 2–3 in Table III that the amount of precipitate produced, is substantially reduced when a surfactant is provided in the aqueous postflush caustic solution. Further trial 10 indicates that even a preflush with water only, can significantly reduce char formation. Trials 11–13 and 15 and 16 though, show that a preflush with an aqueous surfactant solution, considerably decreases the amount of precipitate (again, which is primarily char) formed by the action of sulfur trioxide on the paraffin. Trials 14 and 17 illustrate that even further organic precipitate reduction (and hence char reduction) is obtained, when both the aqueous preflush solution, and the aqueous caustic postflush solution, contain a surfactant. The results of all of Trials 6–17 show that both non-ionic, cationic, and anionic surfactants are effective in the preflush aqueous solution, or postflush caustic aqueous solution, to reduce char formed by the action of sulfur trioxide on the paraffin in the simulator.

Given that one of the best results in Table III, appears to have been obtained in Trial 17, through use of surfactants A and G, these surfactants were again used in their respective flushes with a weight ratio of liquid sulfur trioxide to paraffin being adjusted to 3.5 to 1.0 (the ratio which the results of Table II again indicate should be used for best cleaning of rod 4). The results of these Trials are summarized in Table IV below.

(and hence, char) produced is considerably less than when water alone is used as a preflush treatment. The use of the aqueous fluid viscosified with the hydroxyethyl cellulose, in Trial 20, apparently produced more precipitate than either Trial 21 (water viscosified with the xanthan polymer) or Trial 19 (water alone). First, the viscosified water of Trial 3 visually appeared to have a lower viscosity than that of Trial 4. Further, the fact that more precipitate was apparently produced in Trial 20 than in Trial 19, is considered anomolous, both in view of the results of Trial 21 versus Trial 19, of Table IV, and Trial 23 versus Trial 225 of Table IV, and the results of Table V, these latter two items to be discussed shortly. Trial 22 again illustrates that less char is formed using a preflush treatment solution containing a surfactant, and a postflush caustic treatment containing a surfactant. The benefit of the surfactant being present in both the preflush and the postflush, can be seen by comparing the weight of precipitate formed in Trial 22 with that formed in Trial 19, as well as the substantially decreased rod paraffin residue in Trial 22 versus Trial 19. A comparison of Trial 23 versus Trial 22, again illustrates the substantial advantage in viscosifying the preflush aqueous treatment fluid so that it adheres to the paraffin on rod 4, to a greater extent than the corresponding fluid when not viscosified.

Using the same method already described, a number

TABLE IV
THE EFFECTS OF PRE AND POST TREATMENTS ON REDUCING CHAR FORMED BY SO₃ AND A WESTERN PENNSYLVANIA PARAFFIN

| Trial | Maximum Thermocouple Temp and ΔTemp (°F.) #1(ΔT) | #2(ΔT) | Pretreatment | Paraffin Deposit (gms) | SO₃ in cc | Neutralization Stage/Additives | Precipitate (gms) | Rod Paraffin Residue (gms) |
| --- | --- | --- | --- | --- | --- | --- | --- | --- |
| 18 | 185(9.4) | 158(3.9) | None | 27.0 | 50(12)* | 350 cc of 12% NaOH | 6.0 | <0.1 |
| 19 | 174(14.8) | 138(4.0) | 50 cc of H₂O | 27.5 | 50(12) | 350 cc of 12% NaOH | 5.1 | 0.2 |
| 20 | 160(6.0) | 140(2.0) | 50 cc of H₂O viscosified with 40 lbs HEC¹/1000 gal | 27.4 | 50(12) | 350 cc of 12% NaOH | 6.2 | 0.2 |
| 21 | 190(15.0) | 138(2.5) | 50 cc of H₂O viscosified with 40 lbs X²/1000 gal | 27.2 | 50(12) | 350 cc of 12% NaOH | 4.6 | 0.2 |
| 22 | 182(16.4) | 145(2.3) | 50 cc of 10% A/H₂O | 26.0 | 50(12) | 350 cc of 12% NaOH + 0.5% G | 5.0 | <0.1 |
| 23 | 198(19.6) | 156(2.5) | 50 cc of 10% A/H₂O viscosified with 40 lbs HEC/1000 gal | 26.9 | 50(12) | 350 cc of 12% NaOH + 0.5% G | 2.9 | <0.1 |

*Contact time in seconds
¹Hydroxyethyl cellulose
²A Xanthan polymer sold under the trademark KELZAN XCD Referring to the results of Table IV, Trial 19 again illustrates that a straight water preflush alone reduces the amount of char formed. In addition, it will be seen from Trial 21 that when a viscous fluid, in particular the aqueous fluid viscosified with the xanthan polymer, is used as a preflush treatment, the amount of precipitate of trials were conducted, with the West Texas Paraffin, which as already shown in Table I, is substantially higher in asphaltenes than the West Pennsylvania Paraffin used in the earlier Trials (26.0% versus 1.0%). The results of these Trials are summarized in Table V below.

In Trials 27 and 28 in Table V, it might be noted that the procedure for applying the pretreatment flush was modified somewhat, with a portion of it indicated in each case in Table V, being painted onto the paraffin coated rod with a brush, and the remainder being sprayed on through nozzle 14, in the manner already described.

illustrate the foregoing. However, again the fact that the amount of precipitate measured in Trial 24 is likely below the amount actually produced, would indicate that the benefits of the presence of surfactants in Trials 26–28 are actually considerably greater than might be indicated by comparing the weights of precipitates in

TABLE V

THE EFFECTS OF HIGH ASPAHLTENE CONCENTRATION ON $SO_3$ RESIDUE

| Trial | Thermocouple Temp (°F.) and Temp #1(ΔT) | #2(ΔT) | Paraffin Deposit (gms) | Pretreatment | Amount $SO_3$ (cc) | Neutralization Stage/Additives | Precipitate (gms) |
|---|---|---|---|---|---|---|---|
| 24 | 125(5.0) | 142(1.2) | 27.0 | None | 50 | 350 cc of 12% NaOH | 8.5[1] |
| 25 | 130(5.0) | 162(2.5) | 27.1 | 50 cc of $H_2O$ | 50 | 350 cc of 12% NaOH | 11.0[1] |
| 26 | 185(14.2) | 168(6.8) | 29.0 | 50 cc of 10% A in $H_2O$ viscosified with 40 lbs HEC/1000 gal | 50 | 350 cc of 12% NaOH + 0.5% G | 7.7 |
| 27 | 204(13.0) | 165(2.6) | 27.2 | 18 cc painted on, + 60 cc sprayed, of 10% A in $H_2O$ viscosified with 40 lbs HEC/1000 gal | 50 | 350 cc if 12% NaOH + 0.5% G | 6.0 |
| 28 | 208(13.5) | 170(3.2) | 26.6 | 11.7 cc painted on, + 70 cc sprayed, of 0.5% I in $H_2O$ viscosified with 40 lbs HEC/1000 gal | 50 | 350 cc of 12% NaOH + 0.5% G | 7.8 |

Note:
Contact time was 12 seconds for all of these tests
[1]The precipitate weight of Trials 24 and 25 was probably low, as some precipitate apparently bypassed screen 6 (see text)

It should be noted that during Trials 24 and 25, so much char was produced that screen 6 became plugged. As a result, unreacted sulfur trioxide was neutralized with caustic solution and discharged through a secondary outlet. This was not the normal test procedure as already outlined, and it is very likely that some of the precipitate may have been lost at least in the first test. Thus, the amount of precipitate indicated in Trial 24 in Table V (8.5 grams) is likely too low. No such plugging of screen 6 occurred in Trials 26–28, thus demonstrating qualitatively the effectiveness of preflush and/or postflush surfactant containing aqueous solutions. The amounts of precipitate measured in Trials 26–28, versus the amount of precipitate in Trial 24, quantitatively those Trials with that of Trial 24.

In order to ascertain the actual amount of reduction of organic precipitate in the overall precipitate, analyses of the precipitates in a number of the Trials of the Tables, were conducted. The results of these analyses are summarized in Table VI below. From Table VI, it will be seen that between 85 to about 93% of the precipitate is organic, with the remainder being inorganic in the form of sodium sulfate. The results in Table VII below, confirm that an indication of total precipitate reduction in the Trials of the previous Tables, indicates reduction in organic precipitate. Further, actual percentages of reduction of organic precipitate for most of the Trials, are displayed in Table VI.

TABLE VI

THE EFFECTS OF PRE AND POST TREATMENT ADDITIVES ON TYPE AND AMOUNT PRECIPITATE

| Trial | Treatment Summary | Maximum Temp(°F.) | Grams Paraffin | Precipitate Breakdown (%) Organics | Inorganics | Organic Breakdown (%) Paraffin | Char | Grams Precipitate | Organic | Percent Reduction of Organic Precipitate |
|---|---|---|---|---|---|---|---|---|---|---|
| | | | | Low Asphaltene Paraffin: | | | | | | |
| 6 | —/40SO$_3$/— | 156 | 26.0 | 93.3 | 6.7 | 27.0 | 73.0 | 7.4 | 6.9 | 0 |
| 11 | A/40SO$_3$/— | 205 | 26.4 | 91.2 | 8.8 | 25.0 | 75.0 | 3.0 | 2.7 | 61.0 |
| 7 | —40SO$_3$/G | 148 | 26.4 | 90.0 | 10.0 | 22.0 | 78.0 | 3.7 | 3.3 | 52.2 |
| 8 | —/40SO$_3$/J | 175 | 26.0 | 91.7 | 8.3 | 27.0 | 73.0 | 3.5 | 3.2 | 54.0 |
| 17 | A/40SO$_3$/G | 170 | 27.2 | 92.2 | 7.8 | 19.0 | 81.0 | 2.7 | 2.5 | 74.0 |
| 18 | —/50SO$_3$/— | 185 | 27.0 | 93.0 | 7.0 | 15.0 | 85.0 | 6.0 | 5.6 | 0 |
| 23 | A/50SO$_3$/G (preflush HEC viscosified | 198 | 27.0 | 92.0 | 8.0 | 18.0 | 82.0 | 2.9 | 2.6 | 54.0 |
| 19 | H$_2$O/50SO$_3$/— | 174 | 27.5 | 92.2 | 7.8 | 19.8 | 80.2 | 5.1 | 4.7 | 16.0 |
| 21 | H$_2$O/50SO$_3$/— (preflush viscosified) | 190 | 27.2 | 85.5 | 14.5 | 14.5 | 85.5 | 4.6 | 4.0 | 30.0 |
| 20 | H$_2$O/50SO$_3$/— (preflush HEC viscosified) | 160 | 27.4 | 90.6 | 9.4 | 16.6 | 83.4 | 6.2 | 5.6 | 0 |
| | | | | High Asphaltene Paraffin: | | | | | | |
| 24 | —50SO$_3$/— | 125 | 27.0 | 84.5 | 15.5 | 14.4 | 85.6 | 8.5[1] | 7.2[1] | 0 |
| 25 | H$_2$O/50SO$_3$/— | 130 | 27.1 | 85.2 | 14.8 | 7.0 | 93.0 | 11.0[1] | 9.4[1] | 0 |
| 27 | A/50SO$_3$/G (preflush HEC viscosified) | 204 | 26.7 | 90.4 | 9.6 | 11.4 | 88.6 | 6.0 | 5.4 | 25.0 |

TABLE VI-continued
THE EFFECTS OF PRE AND POST TREATMENT ADDITIVES ON TYPE AND AMOUNT PRECIPITATE

| Trial | Treatment Summary | Maximum Temp(°F.) | Grams Paraffin | Precipitate Breakdown (%) Organics | Inorganics | Organic Breakdown (%) Paraffin | Char | Grams Precipitate | Organic | Percent Reduction of Organic Precipitate |
|---|---|---|---|---|---|---|---|---|---|---|
| 28 | Ethomeen/50SO$_3$/G | 208 | 26.6 | 90.3 | 9.7 | 9.3 | 90.7 | 7.9 | 7.1 | 1.0 |

$^1$These values likely too low (see Table V and text)

It will be seen from comparing the results of Tables III and IV with those of Tables V and VI (for example the weight of precipitate produced in Trial 18 versus 24, 19 versus 25, and 22 versus 27), that considerably more organic precipitate is produced by a higher asphaltene paraffin. Therefore, it may be advantageous to use more surfactant in the pre and postflush treatment solutions where the asphaltene content of the paraffin being removed, is likely to be higher.

To illustrate the effectiveness of preflush and postflush solutions in minimizing the amount of organic precipitates produced, a further Trial 29 was performed in accordance with the method already described. The results of this Trial are summarized in Table VII below.

TABLE VII
BENEFITS OF PRE AND POST TREATMENTS

| Trial | Grams Paraffin | Pretreatment | Amount SO$_3$ (cc) | Neutralization Stage/Additives | Precipitate (gms) | Precipitate % Based On Paraffin |
|---|---|---|---|---|---|---|
| 29 | 39.4 | 75 cc of 10% A in H$_2$O | 75 (22)* | 400 cc of 12% NaOH + 0.5% G | 5.0 | 12.7 |

*Contact time in seconds
Note:
Rod paraffin residue was <0.1 gm

In order to further test the use of surfactants in the preflush and postflush aqueous fluids, two field trials (Trials 30 and 31) were conducted in a well, each with the following well and test conditions:

```
5½" casing to 4,000 ft;
2⅜" tubing to 1,000 ft;
⅝" rods to 1,000 ft;
Thermocouples attached to tubing at 100, 300
and 500 ft;
Temperature tabs attached to the rods with
hose clamp at various depths,
3 gal bucket with ⅛" screen on return line,
Paraffin applied by hand to 500 ft. of rods;
Tubing volume is 3.5 bbls;
Reverse circulate @ ½ bpm
```

Trial 30

21 lbs of paraffin (sample #7) were applied to the top 500 ft of rod for this test. The following further procedure was followed:

```
Purged well with 1,000 scfm of N₂ for 2
minutes;
Pumped 5 gals SO₃ at 0.8 bpm into N₂ pumped
@ 1,000 scfm. SO₃ volume is equivalent to
0.23 gal SO₃ per lb paraffin,
Neutralized with 50 lbs NaOH in 7 bbls water:
4 bbls caustic solution + 2 bbls water
down tubing
3 bbls caustic solution down annulus.
```

Trial 31

22 lbs of paraffin (sample #7) were applied to the top 500 ft of rod for this test and the following further procedure followed:

```
Purged well with 1,000 scfm of N₂ for 2
minutes;
Displaced 4.5 gal of 10% A 90% water
(viscosified with 40 lbs HC/1,000 gals.) from
a shot tank into well with 1,000 scfm N₂ for
30 seconds;
Pumped 5 gals SO₃ at 0.8 gpm into N₂ being
pumped at 1,000 scfm. SO₃ volume is
equivalent to 0.23 gal SO₃ per lb paraffin.
Neutralized with 50 lbs NaOH in 6 bbls water
plus 1 gal G:
4 bbls caustic solution + 2 bbls water
down tubing
2 bbls caustic solution down annulus.
```

The tab temperature profile indicated that the temperatures near the surface were considerably higher than those in Trial 30 (identical test without pre- and post-treatments). The average temperature in Trial 31 was 233.5° F., compared to 221° F. in Run #30.

The profile of the return fluids in Trial 31 was similar to that in Trial 30. A very important aspect of this test was that all of the returns passed through the ⅛— screen leaving no residue. This apparently was the result of the preflush of A/H$_2$O reducing the amount of char formed, and the dispersing of the char that was formed, by the G in the caustic neutralization stage. The use of A or G (surfactants) did not cause a foam problem in the returns.

In Trial 31, the rods were free of paraffin and sludge. There was no char caught in the hose clamps. The rods and rod joints were significantly cleaner than those in Trial 30.

The pH and appearance of return fluids are summarized in Table VIII below. As will be seen from the results of Table VIII, particularly from the appearance of the return fluids, a greater amount of organic precipitate appears to have been successfully removed from the well when the preflush and postflush surfactant containing aqueous treatment solutions were used.

TABLE VIII pH AND APPEARANCE OF THE RETURN FLUIDS

| Amounts of Returns (bbls) | Trial #30 pH | Trial #30 Appearance | Trial #31 pH | Trial #31 Appearance |
|---|---|---|---|---|
| Initial | 6.31 | Clear | 7.84 | Turbid |
| 1.5 | 11.86 | Turbid | 11.98 | Black |
| 3.0 | 11.75 | Black | 11.98 | Black |
| 5.0 | 2.10 | Black | 1.14 | Black |
| 6.0 | 7.35 | Black | 11.70 | Black |

Various modifications and alterations to the embodiments to the invention described above, will be evident to those skilled in the art. Accordingly, the scope of this invention is to be ascertained from the following Claims.

I claim:

1. A method of reducing paraffin deposits on a paraffin contaminated surface, comprising:
   (a) contacting the surface with a $SO_3$ containing liquid to react with the paraffin and covert at least a portion thereof to a water dispersible material; and
   (b) contacting the surface with a surfactant containing fluid, so as to reduce the amount of organic precipitate formed by the action of $SO_3$ on the paraffin.

2. A method as defined in claim 1, additionally comprising rinsing the surface with an aqueous liquid following step (a) and no earlier than step (b) to remove water dispersible material.

3. A method as defined in claim 2, wherein the surface is contacted with the surfactant prior to contacting the surface with the $SO_3$ containing fluid.

4. A method as described in claim 2, wherein the surface is contacted with the surfactant subsequent to contacting the surface with the $SO_3$ containing fluid.

5. A method as described in claim 2, wherein the surface is contacted with the surfactant both prior to and subsequent to, contacting the surface with the $SO_3$ containing fluid.

6. A method for reducing paraffin deposits on a paraffin contaminated surface, comprising:
   (a) contacting the surface with a surfactant providing liquid, which will provide in situ a surfactant in the presence of $SO_3$, so as to reduce and disperse the amount of precipitate formed by the action of $SO_3$ on the paraffin contaminated surface; and
   (b) then contacting the surface with a $SO_3$ containing fluid to react with the paraffin and convert at least a portion thereof to a water dispersible material.

7. A method as defined in claim 6, additionally comprising rinsing the surface with an aqueous liquid following step (b), to remove water dispersible material.

8. A method as described in claim 2, wherein the surfactant containing liquid is a viscous liquid so that a substantial portion thereof adheres to the paraffin deposits.

9. A method as described in claim 2, wherein the surfactant containing liquid is a viscosified aqueous containing liquid, so that an amount of the liquid adheres to the paraffin which is substantially greater than would adhere when the liquid was not viscosified.

10. A method as described in claim 3, wherein the surfactant containing liquid is a viscosified aqueous containing liquid, so that an amount of the liquid adheres to the paraffin which is substantially greater than would adhere when the liquid was not viscosified.

11. A method as described in claim 2 wherein the aqueous liquid is an aqueous alkaline solution.

12. A method as described in claim 3 wherein the aqueous liquid is an aqueous alkaline solution.

13. A method as described in claim 4 wherein the aqueous liquid is an aqueous alkaline solution.

14. A method as described in claim 2, wherein the surfactant containing liquid contains between about 0.01% to about 20% by weight of the surfactant.

15. A method as described in claim 3, wherein the surfactant containing liquid contains between about 0.1% to about 20% by weight of the surfactant.

16. A method as described in claim 10, wherein the surfactant containing liquid contains between about 0.1% to about 20% by weight of the surfactant.

17. A method of increasing production from a crude oil or gas producing well, the production of which has been reduced by paraffin deposit, which method comprises:
   (a) first, suspending production in such well;
   (b) passing a $SO_3$ containing fluid down the tubing of the well to contact the paraffin deposits on the tubing, so as to convert at least a portion of the paraffin to a water dispersible material;
   (c) passing a surfactant containing liquid down the tubing of the well to contact the paraffin deposits on the tubing, so as to reduce the amount of organic precipitate formed by the action of the $SO_3$ on the paraffin;
   (d) then rinsing the tubing with an aqueous liquid to remove the water dispersible material; and
   (d) bringing the well back into production.

18. A method of increasing production from a crude oil or gas producing well, the production of which has been reduced by paraffin deposit, which method comprises:
   (a) first, suspending production in such well;
   (b) passing a $SO_3$ containing fluid down the tubing of the well to contact the paraffin deposits on the tubing and in the formation adjacent to the base of the well, so as to convert at least a portion of the paraffin to a water dispersible material;
   (c) passing a surfactant containing liquid down the tubing of the well to contact the paraffin deposits on the tubing and in the formation adjacent to the base of the well, so as to reduce the amount of organic precipitate formed by the action of the $SO_3$ on the paraffin;
   (d) then rinsing the tubing and adjacent formation with an aqueous liquid to remove the water dispersible material; and
   (e) bringing the well back into production.

19. A method of increasing production from a crude oil or gas producing well, the production of which has been reduced by paraffin deposits, which method comprises:
   (a) first, suspending production in such well;
   (b) passing a surfactant providing liquid, which will provide a surfactant in situ in the presence of $SO_3$ in the well, down the tubing of the well to contact the paraffin deposits on the tubing, so as to reduce and disperse the amount of precipitate formed by the action $SO_3$ on the paraffin deposits in the well;
   (c) next, passing a $SO_3$ containing fluid down the tubing of the well to contact the paraffin deposits on the tubing, so as to convert at least a portion of the paraffin to a water dispersible material;

(d) then rinsing the tubing with an aqueous liquid to remove the water dispersible material; and (e) bringing the well back into production.

20. A method as described in claim 18, wherein the surfactant containing liquid is a viscosified aqueous containing liquid, so that an amount of the liquid adheres to the paraffin which is substantially greater than would adhere when the liquid was not viscosified.

21. A method of increasing production from a crude oil or gas producing well, the production of which has been reduced by paraffin deposit, which method comprises:

(a) first, suspending production in such well;

(b) passing a $SO_3$ containing fluid down the tubing of the well to contact the paraffin deposits on the tubing, so as to convert at least a portion of the paraffin to a water dispersible material;

(c) passing a surfactant containing liquid, which contains between about 0.01% to about 20% by weight of the surfactant, down the tubing of the well to contact the paraffin deposits on the tubing, so as to reduce the amount of precipitate formed by the action of the $SO_3$ on the paraffin;

(d) then rinsing the tubing with an aqueous liquid to remove the water dispersible material; and (d) bringing the well back into production.

22. A method as described in claim 21, wherein the surfactant containing liquid is a viscosified aqueous containing liquid, so that an amount of the liquid adheres to the paraffin which is substantially greater than would adhere when the liquid was not viscosified.

23. A method as described in claim 2, wherein the amount of $SO_3$ used, is sufficient such that the weight ratio of $SO_3$ to paraffin, is at least bout 3.5 to 1.

24. A method as described in claim 6, wherein the amount of $SO_3$ used, is sufficient such that the weight ratio of $SO_3$ to paraffin, is at least bout 3.5 to 1.

25. A method as described in claim 17, wherein the amount of $SO_3$ used, is sufficient such that the weight ratio of $SO_3$ to paraffin, is at least about 3.5 to 1.

26. The method of claim 1 wherein said paraffin contaminated surface is a surface within a well.

27. The method of claim 6 wherein said paraffin contaminated surface is a surface within a well.

* * * * *